No. 673,137. Patented Apr. 30, 1901.
H. R. LAMB.
POWER TRANSMITTING MECHANISM.
(Application filed May 8, 1900.)
(No Model.) 2 Sheets—Sheet 1.
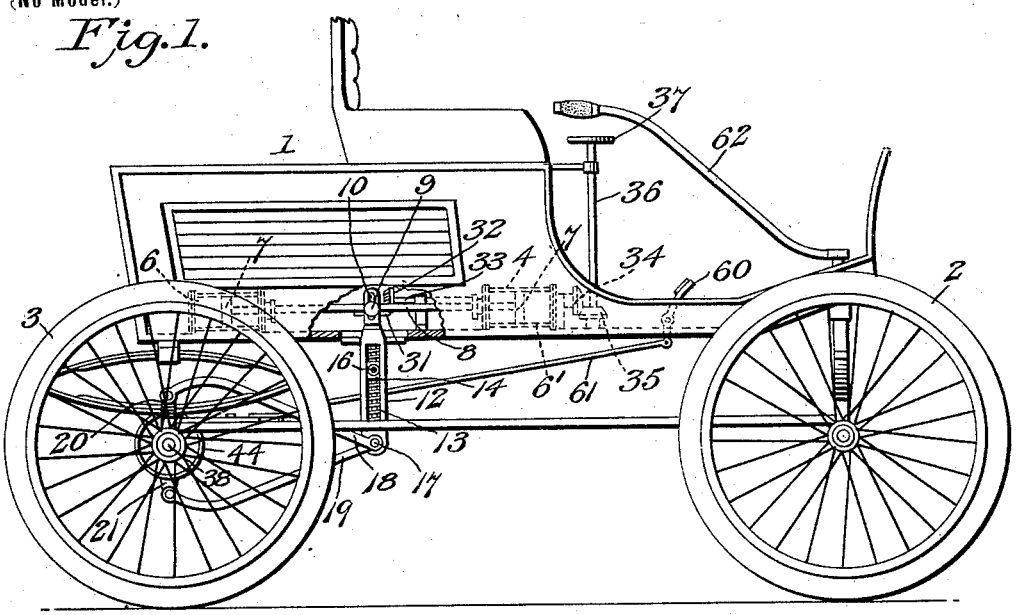
Witnesses
Edwin G. McKee
Louis G. Julihn
Hiram R. Lamb Inventor
By
Attorney No. 673,137. Patented Apr. 30, 1901.
H. R. LAMB.
POWER TRANSMITTING MECHANISM.
(Application filed May 8, 1900.)
(No Model.) 2 Sheets—Sheet 2.
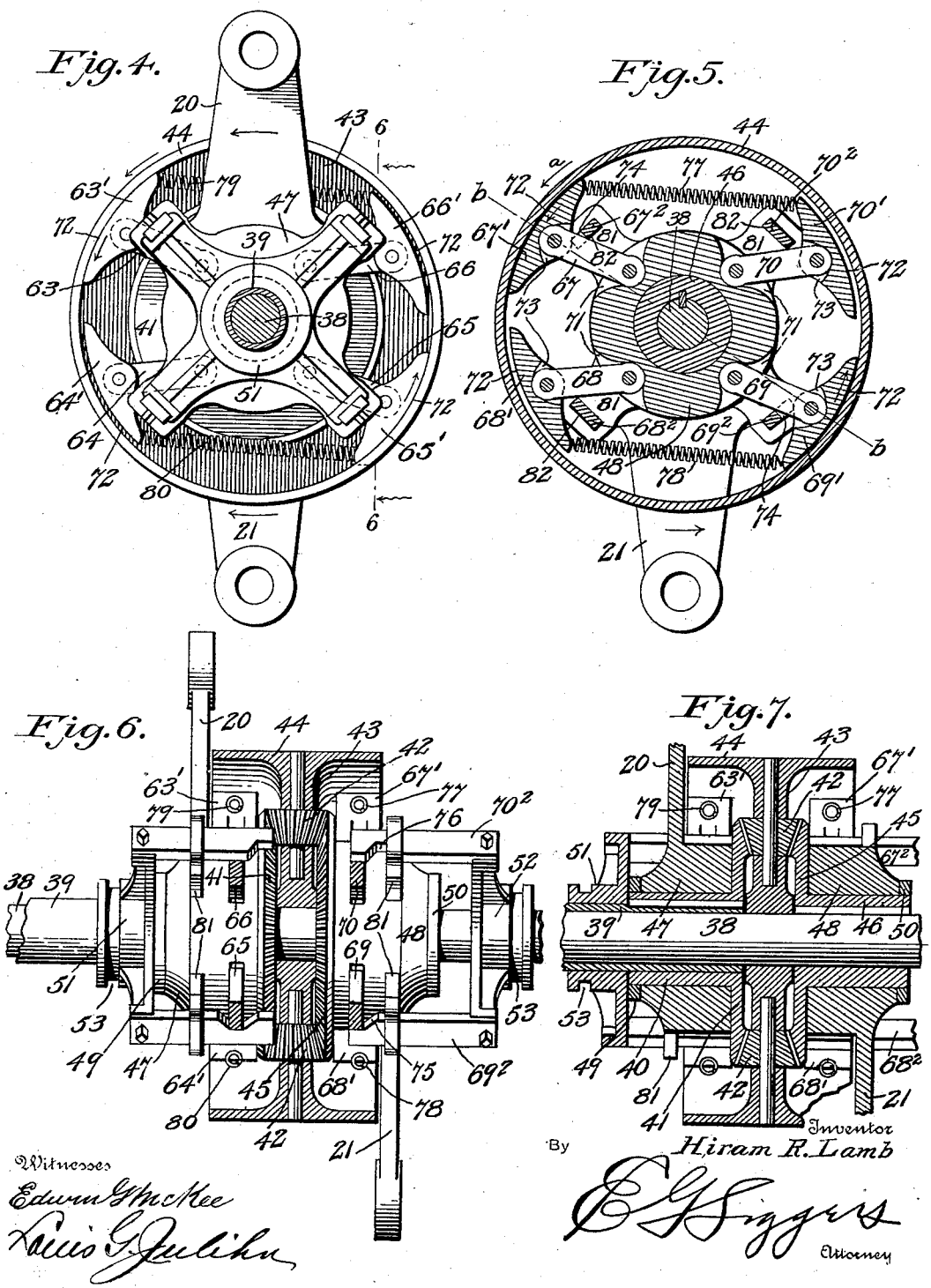
Witnesses
Edwin G. McKee
Louis G. Julihn
Inventor
Hiram R. Lamb
By E. G. Siggers
Attorney

UNITED STATES PATENT OFFICE.

HIRAM R. LAMB, OF ADRIAN, MICHIGAN.

POWER-TRANSMITTING MECHANISM.

SPECIFICATION forming part of Letters Patent No. 673,137, dated April 30, 1901.

Application filed May 8, 1900. Serial No. 15,936. (No model.)

*To all whom it may concern:*

Be it known that I, HIRAM R. LAMB, a citizen of the United States, residing at Adrian, in the county of Lenawee and State of Michigan, have invented a new and useful Power-Transmitting Mechanism, of which the following is a specification.

This invention relates to improvements in power transmitting, regulating, and reversing mechanism designed with special reference to motor-vehicle construction, but capable of employment in any connection requiring the transmission of power from a reciprocatory element to a rotary element—as, for instance, a shaft—wherein it is desirable to vary the speed of the driven member without interrupting the operation of the driving mechanism and wherein it may be desired to reverse the direction of the transmitted motion.

The invention consists in the provision of an oscillating member connected adjustably at one end to a reciprocating driving element and at its opposite end with power-transmitting mechanism and having a movable fulcrum located intermediate of its ends and designed to be shifted for the purpose of increasing or diminishing the relative movements of the driving and driven or transmitting elements by means of a controlling device located within convenient reach of the operator.

The invention further consists in the provision of a novel form of power-transmitting mechanism operated by the motor or driving mechanism through the medium of the variable gearing just referred to and equipped with novel reversing mechanism, by means of which the transmitted motion may be imparted in the desired direction to the driven element.

The invention further consists in certain details of construction and arrangement, all of which will more fully appear hereinafter, will be illustrated in the accompanying drawings, and will be embraced within the scope of the appended claims.

In the drawings, Figure 1 is a side elevation of an automobile or motor vehicle of that particular type which have come to be designated as "locomobiles," equipped with a motor and with power transmitting, regulating, and reversing mechanism constructed in accordance with my invention. Fig. 2 is a detail sectional view, on a somewhat-enlarged scale, of the speed regulating or changing mechanism. Fig. 3 is a sectional view on the line 3 3 of Fig. 2. Fig. 4 is an elevation of the clutch device. Fig. 5 is a similar view of parts hidden in Fig. 4. Fig. 6 is a sectional elevation on the irregular line 6 6 of Fig. 4. Fig. 7 is a central longitudinal section through the subject-matter of Figs. 4 and 6, and Fig. 8 is a diminutive general view illustrating one form of mechanism which may be employed for shifting the reversing-collars.

Referring to the numerals of reference employed to designate corresponding parts and structural features in the several views, 1 indicates a motor-vehicle, the running-gear of which comprehends, as usual, the front wheels 2 and the rear driving-wheels 3.

4 indicates a motor, (illustrated diagrammatically in dotted lines in Fig. 1, as said motor may be of any desired type.) As shown, the motor may comprehend the cylinders 6 and 6', within which reciprocate the pistons 7, connected by an intermediate piston-rod 8. At any suitable point the piston-rod 8 is pierced by a transverse pintle 9, received within longitudinal slots 10, formed in the bifurcated end 11 of a power-transmitting and speed-regulating reciprocatory element or rocker 12, provided with an elongated way 13, within which is designed to be adjustably retained a fulcrum-block 14, provided with projections 15, conforming to the ways 13 and carried by a fulcrum-stud 16, comprising the fulcrum from which the rocker 12 oscillates or vibrates under the impulse of the piston-rod. At the lower extremity of the rocker 12 are pivoted upon a stud 17 the front ends of a pair of rearwardly-divergent pitmen 18 and 19, the opposite extremities of which are pivotally connected to oppositely-disposed driving-levers 20 and 21, arranged for alternate engagement with the driving-wheels through the medium of a novel form of clutch device, to be described. It should be noted, however, in order that the immediately-succeeding description may be properly comprehended that the oscillation of the rocker 12 causes the actuation of the driving-levers 20 and 21, each of which is active only during its movement in one direction. It therefore follows, assuming the stroke of the piston-rod to be constant as to both extent and speed, that the effective stroke of either driving-lever will be governed by the location of the fulcrum of the rocker 12. With this fact in view, and being desirous of providing a simple form of speed-changing mechanism, I have provided a simple device for adjusting the fulcrum-block 14 longitudinally within the ways 13 in order to shift the fulcrum of the rocker by means of a simple form of actuating mechanism, the operating element of which is located in proximity to the operator's seat and within convenient reach of the operator.

The fulcrum-stud 16 immediately adjacent to the fulcrum-block 14 is screw-threaded for the reception of a threaded bearing-block 22, adjustable in ways 23, formed in a hanger 24, depending from the bottom of the vehicle and provided at its lower extremity with a step-bearing 25, in which is stepped the terminal trunnion 26 of a fulcrum-adjusting screw 27, passing through an internally-threaded head 28 upon the fulcrum-stud 16 and carried upwardly through the bottom 29 of the vehicle and through a bearing-bracket 30, above which the screw 27 is provided with a terminal bevel gear-wheel 31. The gear-wheel 31 meshes with a similar gear-wheel 32, carried by a horizontal shaft 33, extending to a point below the front of the operator's seat, where it is provided with a terminal bevel-gear 34, meshing with a similar gear-wheel 35, keyed upon a stand-shaft 36, at the upper end of which is mounted the operating-wheel 37. It will now be seen that when it is desired to increase or diminish the speed of the vehicle without interfering with the operation of the motor the operating-wheel 37 is turned in the proper direction to effect, through the intermediate gearing, the rotation of the fulcrum-adjusting screw 27, which by reason of its threaded connection with the head 28 will cause the fulcrum-stud 16 to be shifted toward or from the upper end of the rocker 12 and carrying with it the fulcrum-block 14 and the bearing-block 22, the former serving to constitute a bearing intermediate of the rocker and stud and the latter serving to provide a firm bearing for the stud to insure its rigid retention as a fulcrum-support for the rocker.

We have now seen in what manner the regulation of the pitman-stroke is accomplished, and I shall proceed to a description of the novel form of clutch device which I employ for the purpose of effecting the alternate engagement of the driving-levers 20 and 21 with the driving-wheels of the vehicle and for effecting such reorganization of the gearing as will result in the transmission of power to reverse the direction of rotation of the gearing for the purpose of reversing the vehicle without the employment of link-motions or similar reversing devices ordinarily employed in connection with motors.

38 indicates the rear axle, to which one of the driving-wheels 3 of the vehicle is keyed, and 39 indicates a sleeve or hollow shaft encircling the shaft 38 and carrying the other driving-wheel 3, located at the opposite side of the vehicle. Upon the inner end of the sleeve is keyed the hub 40 of a bevel gear-wheel 41, meshing with a series of bevel-pinions 42, arranged in circular series in the web 43 of a comparatively wide clutch-rim 44, the web 43 being mounted directly upon the shaft 38. At the side of the web opposite the gear-wheel 41 a second gear-wheel 45 is intermeshed with the pinions 42, and the hub 46 of this second gear-wheel 45 is keyed directly to the shaft 38 as distinguished from the mounting of the wheel 41, which, as stated, is keyed directly to the sleeve 39. Revolubly mounted upon the hubs 40 and 46 of the gear-wheels 41 and 45 are the hub-disks 47 and 48 of the driving-levers 20 and 21, retained in place upon the hubs by bearing-rings 49 and 50, retained upon the ends of the hubs 40 and 46 in any suitable manner, and against the outer faces of each of which are disposed the dog actuating or shifting collars 51 and 52, loosely mounted upon the sleeve 39 and shaft 38, respectively. These shifting collars 51 and 50 are designed to be simultaneously actuated in one direction or the other for a purpose to be explained, and they may therefore be provided with peripheral grooves 53 for the reception of the forked ends 54 of a shifting yoke 55, mounted in suitable bearings 56, and from which extends a stud 57, engaging a slot 58 in a bell-crank lever 59, designed to be swung by a foot-lever or other suitable reversing element 60, operatively connected with the bell-crank lever 59 by means of a connecting-rod 61. The foot-lever 60 is preferably located, as illustrated, above the floor of the vehicle immediately in front of the operator's seat, in order that the operator when seated in the vehicle may control the speed of the vehicle by means of the controlling-wheel 37, the direction of movement of the vehicle by the manipulation of the foot-lever 60, and that he may guide said vehicle by means of the starting-lever 62, extending, as usual, from the steering-gear of the automobile.

Returning now to a consideration of the gearing proper, each of the hub-disks 47 and 48 of the driving-levers 20 and 21 is provided with four pivoted shoe-carriers 63, 64, 65, and 66, designating the carriers mounted upon the hub-disk 47, and 67, 68, 69, and 70, indicating the correspondingly-positioned carriers of the hub-disk 48. These shoe-carriers are nothing more nor less than swinging links pivotally mounted within depressions 71 in the peripheries of the hub-disks and pivotally supporting at their outer end a somewhat-elongated clutch-shoe, (designated by the numerals 63', 64', 65', 66', 67', 68', 69', and 70,) having their outer faces 72 curved in corresponding degree to the rim 44 and provided upon their inner faces with sockets 73 for the pivotal reception of the outer free ends of the carriers. Inasmuch as these carriers and shoes are best illustrated by Fig. 5 of the drawings, and as these elements are identical in both construction and arrangement in connection with both of the hub-disks 47 and 48, I will describe the arrangement and manner of operation of the subject-matter of Fig. 5, it being understood that this description applies with equal force to corresponding parts carried by the hub-disk 47 and illustrated more particularly in Fig. 4. The carriers and shoes are arranged in pairs, one pair serving as clutch mechanism when it is desired to positively propel the rim in one direction and the other pair serving a similar purpose when it is desired to effect a reversal of the rim.

Assuming that the desired direction of rotation of the rim 44 is indicated by the arrow $a$ in Fig. 5, the shoes 67' and 69', located at diametrically opposite points, will be the effective clutching members, as those two shoes constitute one of the pairs referred to. The reason for this is that the carriers 67 and 69 are of greater length than the space intervening between the faces of the cavities 63 and the depressions 71 when these cavities and depressions are in radial alinement with the axis of the shaft 38. Therefore with the shoes 67' and 69' in direct diametrical opposition (indicated by the dotted diametrical line $b\ b$ in Fig. 5) the inner ends of the carriers 67 and 69 must be to the rear of the radial line piercing the axis of the shaft 39 and the pivotal connections of the carriers with the shoes 67' and 69'. In other words, these carriers are of such length that they cannot be accommodated in diametrical alinement and must consequently be inclined, the effect of which is to constitute said carriers and the connected rotary hub-disk a pair of toggle members, which when the driving-lever 21 is urged in the direction indicated by the arrow thereon in Fig. 5 will have their knuckles urged in a direction to cause the shoes 67' and 69' to be forced with considerable pressure against the inner face of the rim 44 in order to compel the rotation of said rim under the impulse of the driving-lever clutched thereto. The other pair of clutch-shoes 68' and 70' are designed to act in unison, but must be inactive when the shoes 67' and 69' are employed for effecting the propulsion of the rim. The carriers 68 and 70 are therefore oppositely disposed with respect to the carriers 67 and 69—that is to say, their inner ends are located in advance instead of in the rear of a diametrical line piercing the pivotal connections between said carriers and shoes, the direction of rotation still being considered, as indicated by the arrow $a$, in order that these comparative terms "in the rear" and "in advance" may be properly comprehended. It will therefore be seen that such rotary movement of the hub-disk 47 as would spread the toggles comprising the carriers 67 and 69 would have the opposite effect on the toggles comprising the carriers 68 and 70. Obviously, therefore, these pairs of clutch-shoes will be oppositely active and will serve, under proper conditions, to clutch the rim with the driving-lever during movements of the latter in opposite directions.

It is necessary to provide means for retaining one or the other of the pairs of shoes entirely out of active relation with the rim when it is desired to propel the vehicle in one direction or the other, because otherwise one pair of shoes would clutch during the rearward movement of the driving-lever and the other pair would clutch in a similar manner during its forward movement. I therefore provide what may be termed a "series of dogs" extending inwardly from the shifting collars 51 and 52 and designed to dog one or the other of the pairs of shoe-carriers of each hub-disk in their inactive positions. One of these dogs is provided for each of the shoe-carriers, the dogs $67^2$ and $69^2$ being provided with terminal recesses 74, located behind the carrier 67 and having inclined faces 75, which facilitate the longitudinal movement of the dogs to force the outer ends of the carriers forwardly, and thereby withdraw the shoes 67' and 69' from contact with the rim 44 when it is desired to reverse the direction of rotation of said rim by bringing the shoes 68' and 70' into engagement with the rim.

As shown in Fig. 5 of the drawings, the dogs $67^2$ and $69^2$ are shown withdrawn, as indicated in Fig. 6, to permit the carriers 67 and 69 to drop back into the terminal recesses 64, which permits the shoes 67' and 69' to contact with the rim under the impulse of the hub-disk 48 when rotated in the direction of the arrow $a$. The dogs $68^2$ and $70^2$ have their carrier-receiving recesses 76 out of alinement with the carriers 68 and 70, so that the latter are dogged in their inoperative positions, it being understood that the recesses 74 of the dogs $67^2$ and $69^2$ are disposed in such alternate arrangement with respect to the recesses 76 in the dog $68^2$ and $70^2$ as to be alternately active to dog either pair of shoe-carriers in their inactive positions as desired.

As hereinbefore stated, the driving-levers are designed to be given an oscillatory movement, and it will therefore appear necessary to provide means for insuring the dragging in one direction of the clutch-shoes, which are actively related to the rim, without permitting said shoes to drop away from the rim to any appreciable extent. For this purpose I connect the contiguous ends of the shoes 61' and 70' by a spiral spring 77, the opposite contiguous ends of the shoes 68' and 69' by a similar spring 78, and the corresponding shoes of the hub-disk 47 by similar springs 79 and 80. Any suitable means for properly supporting and guiding the dogs in their reciprocatory movements may be provided upon the hub-disks; but I prefer to cast the latter with radial lugs 81, provided with transverse openings 82, through which the dogs extend and in which they are guided.

The operation of my device is as follows: Supposing the apparatus to be organized for use in connection with automobiles, as illustrated in Fig. 1 of the drawings, the motor is set in operation in the usual manner to cause the reciprocation of the piston-rod 8. The connection of the latter with the rocker 12 will cause the oscillation of the rocker upon the fulcrum-studs 16, and the pitmen 18 and 19 will be reciprocated to oscillate the driving-levers 20 and 21 in opposite directions. As these levers extend in opposite directions, they will have identical effect on a driven element common to both, provided said driven element is connected with the driving-levers during opposite oscillations of the latter—that is to say, if the driving-lever 20 is clutched to the rim during its rearward oscillation it will rotate the rim in the direction of the arrow in Fig. 4, and the same direction of rotation of the rim will be maintained if it is connected with the driving-lever 21 during the forward oscillation of the latter. Assuming, therefore, that the shifting collars 51 and 52 have been positioned, in order to organize the clutch device, as illustrated in the drawings, the simultaneous rearward reciprocation of the driving-levers 20 and 21 will cause the clutch-shoes 63' and 65' of the hub-disk 47, connected to the driving-lever 20, to grip the rim and effect the rotation of the latter in the direction indicated by the arrow in Fig. 4. During this movement the driving-shoes 67' and 69' of the hub-disk 48 will be dragging—that is to say, they will be moving in the direction opposite the direction of rotation of the rim and independently thereof. As the rocker swings back, drawing the pitmen forwardly, the reverse operation will take place—that is to say, the shoes 63' and 65' will drag and the shoes 67' and 69' will clutch to continue the rotation of the rim in the direction of the arrow. In fine, the rearward reciprocation of the pitmen will rotate the rim under the impulse of the driving-lever 20, and their forward reciprocations will rotate the rim in the same direction under the impulse of the driving-lever 21. The reversal of the gearing is effected by exerting pressure upon the foot-lever 60, which effects the shifting of the shifting collars 51 and 52, causing the carriers 63 and 65 and 67 and 69 to be dogged in their inactive positions and presenting the recesses 76 to the carriers 64 and 66 and 68 and 70, to permit the latter to move into their active positions for the purpose of effecting the reverse rotation of the rim in an obvious manner.

When it is desired to regulate the speed of the vehicle, the strokes of the pitmen are increased or diminished by shifting the fulcrum of the rocker 12, which, as stated, is effected by the manipulation of the controlling-wheel 37, which rotates the fulcrum-adjusting screw 27 to elevate or depress the fulcrum-stud 16 and the fulcrum-block 14 carried thereby, which latter constitutes the bearing for the rocker.

From the foregoing it will be understood that I have invented a simple, durable, and highly-efficient apparatus by means of which I am enabled to attain the several objects hereinbefore stated; but while I believe the present construction of the device to be preferable, I do not limit myself to the structural details defined, but reserve the right to effect such changes, modifications, and variations as may fall within the scope of the protection prayed.

What I claim is—

1. The combination with a rocker, of a shiftable fulcrum for said rocker, driven mechanism connected to the rocker at one side of its fulcrum, and means for adjustably connecting a driving element to the rocker at the other side of its fulcrum, said adjustable connection constituting means independent of the adjustable fulcrum for regulating the leverage exerted by the rocker.

2. The combination with driven mechanism and a pair of driving-levers, of a plurality of oppositely-active pairs of clutch mechanisms operatively related with each lever and designed to effect an operative connection between said levers and the driven mechanism, the clutch mechanisms of each pair alternating with the clutch mechanisms of the opposed pair, and means for rendering either pair of clutch mechanisms inactive to effect the propulsion of the driven mechanism in either direction.

3. The combination with a bearing-bracket and a bearing-block movable therein, of means for shifting the position of the bearing-block within the bracket, a fulcrum-block movable with the bearing-block but capable of movement upon an axis, a longitudinally-movable rocker mounted upon the fulcrum-block but having adjustable relation therewith, and means for adjustably connecting a driving element to the rocker, said means serving independently of the fulcrum-block for regulating the leverage exerted by the rocker.

4. The combination with driven mechanism, and a pair of driving-levers, of oppositely-active clutch mechanisms operatively related with each lever and designed to effect an operative connection between said levers and the driven mechanism, and dogs arranged to throw either of the clutch mechanisms of the levers into inactive positions to permit the other clutch mechanisms to establish an effective connection between the driving-levers and the driven mechanism.

5. The combination with a sleeve and shaft and a wheel carried by each of said elements, of a clutch-rim operatively related to the sleeve and shaft, respectively, a pair of independently-rotary hub-disks, pivoted shoe-carriers carried by each disk, clutch-shoes carried by each carrier, and means for rotating the hub-disks.

6. The combination with a shaft and sleeve, and a driving-wheel carried by each, of a clutch-rim, gearing connecting the clutch-rim with the sleeve and shaft, respectively, independently-rotary hub-disks, oppositely-disposed clutches upon both of the hub-disks and operatively related with the clutch-rim, means for dogging the corresponding clutch of each hub-disk out of operative relation with the rim, and oppositely-disposed driving-levers connected to the hub-disks.

7. The combination with a shaft and sleeve, of a clutch-rim, gearing connecting said clutch-rim with both the shaft and sleeve, a pair of independently-rotary hub-disks, pivoted shoe-carriers extending from each disk, shoes pivotally mounted upon the carriers, reciprocatory recessed dogs in operative relation to the carriers, and means for simultaneously operating the dogs to dog certain carriers and release certain others.

8. The combination with a shaft and sleeve, of a clutch-rim, means for operatively connecting the clutch-rim with said shaft and sleeve, a plurality of independently-rotary hub-disks, duplicate sets of oppositely-disposed shoe-carriers pivotally connected to each of said hub-disks, pivoted shoes mounted upon the outer end of each carrier, a series of reciprocatory dogs extending in opposite directions into contact with the shoe-carriers mounted upon each hub-disk, said dogs being provided with recesses opposed to the carriers, the recesses opposed to each set of carriers being disposed in a different plane from that of the recesses opposed to the other set of carriers, whereby the longitudinal movement of the dogs serves to dog the sets of carriers alternately in their inactive positions.

9. The combination with a shaft and sleeve, of opposed wheels having their hubs keyed to the shaft and sleeve, respectively, a hub-disk revolubly mounted upon each hub, a driving-lever extending from each hub-disk, corresponding pivoted shoe-carriers supported by each disk, the carriers upon each disk being arranged in opposed sets, shoes pivotally mounted at the outer ends of the carriers, a shifting collar beyond each of the hub-disks, a series of dogs extending from each of said shifting collars into operative relation with the carriers of the adjacent disk, a clutch-rim operatively related to the shoes, and pinions connecting the clutch-rim with the gear-wheels.

10. The combination with a shaft and sleeve, of gear-wheels keyed upon said shaft and sleeve, a clutch-rim provided with a central web mounted upon the shaft, pinions mounted in the web and meshing with said gear-wheels, independent hub-disks rotatably mounted upon the hubs of the gear-wheels, driving-levers extending from said disks, corresponding pivoted carriers extending in each of the hub-disks, the carriers of each disk having an alternately-opposed relation, pivoted spring-retained shoes upon the carriers, a shifting collar for each hub-disk, a series of dogs extending from each collar into operative proximity to the carriers of the adjacent disk, the dogs opposed to the carriers disposed in one direction being provided with recesses out of alinement with recesses formed in the dogs opposed to the other carriers.

11. The combination with a rocker, a shiftable fulcrum for said rocker, and means for shifting said fulcrum, of a driving element connected to the rocker at one side of its fulcrum, a plurality of pitmen connected to the rocker at the opposite side of its fulcrum, a driven mechanism, separate clutch mechanisms connecting the pitmen with the driven mechanism, and means for reversing the effective operation of the clutch mechanisms.

In testimony that I claim the foregoing as my own I have hereto affixed my signature in the presence of two witnesses.

HIRAM R. LAMB.

Witnesses:
E. C. LAMB,
A. BENNETT.